United States Patent [19]

Formica

[11] Patent Number: 5,133,144

[45] Date of Patent: Jul. 28, 1992

[54] TIPUP DEVICE WITH LIGHT TRANSMITTING SUPPORT

[76] Inventor: Anthony J. Formica, E. Glen Rd., Denville, N.J. 07834

[21] Appl. No.: 576,953

[22] Filed: Sep. 4, 1990

[51] Int. Cl.$^5$ .............................................. A01K 97/12
[52] U.S. Cl. ........................................................... 43/17
[58] Field of Search .................................................. 43/17

[56] References Cited

U.S. PATENT DOCUMENTS

| | | |
|---|---|---|
| D. 196,888 | 11/1963 | Pilsner ............................... 43/17 |
| 1,253,746 | 1/1918 | Teeling ............................... 43/17 |
| 2,565,379 | 8/1951 | Laurila . |
| 2,587,190 | 2/1952 | Merriweather . |
| 2,598,778 | 6/1952 | Fred . |
| 2,636,303 | 4/1953 | Feigley et al. . |
| 2,651,875 | 9/1953 | Brockman . |
| 2,785,493 | 3/1957 | Thiel . |
| 2,786,294 | 3/1957 | Whitacre . |
| 2,908,100 | 10/1959 | Mogren . |
| 3,230,655 | 1/1966 | Nomsen ............................... 43/17 |
| 3,698,117 | 10/1972 | Wiltse ............................... 43/17 |
| 3,745,689 | 7/1973 | Williams ............................... 43/17 |
| 4,253,262 | 3/1981 | Johnson . |
| 4,310,983 | 1/1982 | Irwin ............................... 43/17 |
| 4,780,979 | 11/1988 | Dyck et al. . |
| 4,794,718 | 1/1989 | Tillman ............................... 43/17 |
| 4,821,446 | 4/1989 | Beaulieu, Jr. . |
| 4,862,627 | 9/1989 | Keller ............................... 43/17 |
| 4,934,090 | 6/1990 | Storey ............................... 43/17 |
| 4,953,317 | 9/1990 | Ruchel ............................... 43/17 |

Primary Examiner—Kurt Rowan
Attorney, Agent, or Firm—Mathews, Woodbridge & Collins

[57] ABSTRACT

The present invention comprises an improved apparatus for fishing through a hole in the ice. The improvement comprises a light transmitting hole cover through which a portion of the apparatus passes. The hole cover transmits sunlight into the hole to heat it and prevent it from freezing over.

21 Claims, 6 Drawing Sheets

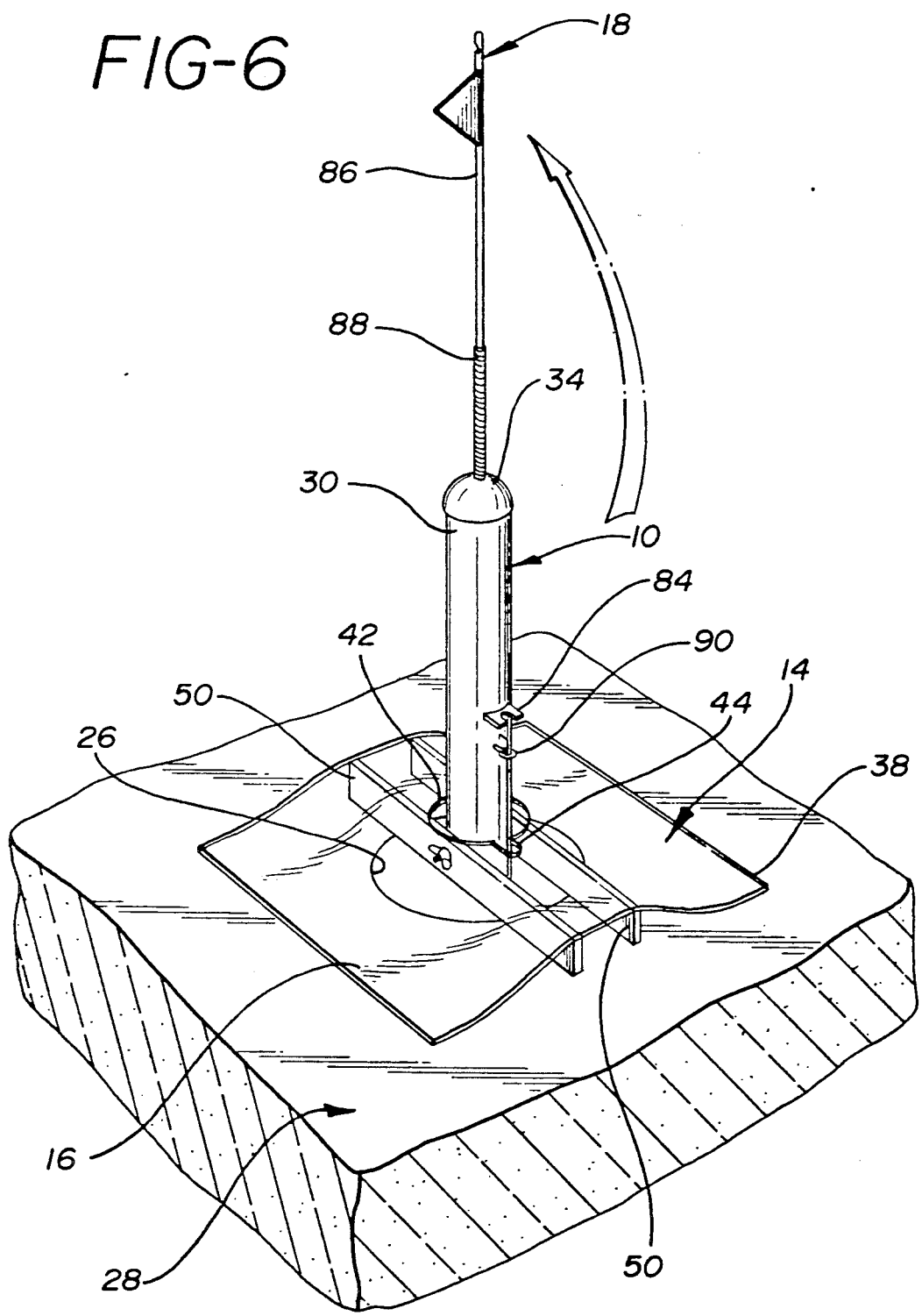

TIPUP DEVICE WITH LIGHT TRANSMITTING SUPPORT

BACKGROUND OF THE INVENTION

1. Field of the Invention

The present invention relates to an apparatus for fishing through a hole in the ice; more particularly, the invention relates to such an apparatus which comprises a light transmitting hole cover.

2. Description of Related Art

For the purposes of this invention, a "tipup" is a remote fishing device useful to fish through a hole in the ice. Tipups comprise a means for support on the ice, and means to catch fish. Typically there is a means to signal the catching of a fish. These devices are used for ice fishing and get their names from a common signal means which "tips up" when a fish pulls the line. However, the present invention is not limited by the type or presence of a signal means.

The sport of ice-fishing is enjoying increased popularity. There are, however, several problems and inconveniences associated with this activity. Ice fishing entails fishing through a hole in the ice. A suitable device such as a tipup is supported above a hole in the ice. In freezing weather, ice fishermen must periodically scoop ice and slush from the fishing hole to prevent the hole from freezing over. Because of the location and conditions usually associated with ice fishing, it is desirable for tipups and related fishing paraphenalia to be light, easy to transport and minimize working under sometimes difficult conditions.

The problem of the hole freezing over has been recognized in the art and addressed in U.S. Pat. No. 2,786,294 which discloses the use of a circular plate secured to the center of the tip up device for resting on the ice. The circular plate is used to prevent ice and slush from entering the hole in which the device sits, thereby eliminating the need to clean the hole and device. It is suggested that this device will not freeze up. This device further contains a light for night use.

U.S. Pat. No. 4,253,262 discloses an ice fishing tipup device which includes a heated floatation member. The heat is used to prevent the hole in the ice through which the device sits from freezing closed. The heat is provided by means of a large bowl-like member attached to the body of the device. Combustible materials are placed in the bowl to generate the heat.

U.S. Pat. No. 4,780,979 discloses an ice fishing device which has an integrally molded base and a plug extending downward from the underside of the base to engage and close a hole in the ice while the edge of the base sits upon the ice. The base and plug thereby prevent or inhibit refreezing of the hole.

U.S. Pat. No. 2,565,379 discloses an ice fishing tipup device having a signal releasing means which is activated by the operation of a reel located below the surface of the water where it will not freeze.

U.S. Pat. No. 2,651,875 discloses an ice fishing tipup device in which the strike indicator releasing mechanism is improved and the tipup is so constructed that it is easily positioned over a hole in the ice. The structure of the device is compact and foldable and may be largely made of light and inexpensive material, such as waterproofed wood.

As indicated from the art, a recognized problem with ice fishing is that the hole tends to freeze up. Attempts are continually made to improve ice fishing devices to address this problem. At the same time, it is desirable to make ice fishing devices, which may sometimes have to be carried to remote fishing locations, as light and easy to use as possible.

SUMMARY OF THE INVENTION

The present invention comprises an improved apparatus for fishing through a hole in the ice. The improvement comprises a light transmitting hole cover through which the apparatus passes. The hole cover can transmit sunlight into the hole to provide heat to the hole, beneath the cover and bordered by the water at the bottom and ice on the sides. The hole cover is preferably transparent or translucent and most preferably transparent. The hole cover is preferably made from a rigid plastic sheet which can support the apparatus on the ice.

In a preferred embodiment, the hole cover is removably attached to the apparatus and supports it on the ice. The apparatus of the present invention further comprises a body member, a means to catch a fish connected to the body, and preferably a means to signal the catching of a fish which is interconnected to the means to catch a fish. Preferably, the means to signal is attached to the the body member of the apparatus. The light transmitting hole cover is especially suited for use with ice-fishing "tipups" which are designed to be unattended on the ice for prolonged periods.

The light transmitting hole cover of the present invention can be used with known apparatus for fishing through a hole in the ice such as disclosed in the above referenced patents. The present invention therefore includes a system for fishing in water beneath a hole in ice comprising a fishing apparatus used in combination with a light transmitting hole cover. The system is especially suited for the use of the light transmitting hole cover with existing devices which comprise a body member, a means to maintain at least a portion of the body member above the surface of the water, and a means to catch fish attached to the body member. The means to catch fish is capable of extending into the water.

The means to maintain at least a portion of the body member above the surface of the water is preferably the light transmitting hole cover which can be connected to the body member. The hole cover is supported on the ice surrounding the hole. At least a portion of the body member preferably passes through the body member. Alternatively, the apparatus can be supported by other means such as a float connected to the body member, an arm holding the body member in place, or transverse rods pivotally attached to the body member In addition to physically shielding the hole from exterior wind and cold, the light transmitting hole cover of the present invention permits radiant energy from the sun to warm the water beneath the hole. The surface of the ice under the cover's edges melts and a seal can form between the edge of the cover and the ice. The boundry between the ice and the edge of the cover can be sealed with a covering of snow or ice. The hole is prevented from freezing closed and its contents, i.e the apparatus, is prevented from freezing. Additionally, ice shavings which fall into the water as a result of cutting the hole melt and there is no need to scoop them out prior to inserting the apparatus. The light transmitting hole cover is preferably constructed of a transparent material such as a sheet of plastic, to facilitate this "greenhouse effect." For certain types of fishing, a translucent hole cover is preferred. The present invention can be disassembled for easy transport.

BRIEF DESCRIPTION OF THE DRAWINGS

FIG. 6 is view in perspective of another alternate embodiment of the apparatus of the present invention.

DESCRIPTION OF THE PREFERRED EMBODIMENT

The improved apparatus of the present invention for fishing through a hole in the ice will be understood by those skilled in the art by having referenced FIGS. 1-6.

The improvement of the present invention comprises a light transmitting hole cover through which a portion of the apparatus can pass. The hole cover substantially covers the hole. At least a portion of the apparatus extends through the hole cover to permit at least part of a means to fish to extend into the water. Preferably, the hole cover can be used to support the apparatus.

The apparatus of the present invention is preferably an improved tipup for fishing through a hole in the ice. The tipup can be supported on the ice by any suitable means and is preferably supported by the hole cover of the present invention. A portion of the tipup extends through the hole cover.

Figure 1:
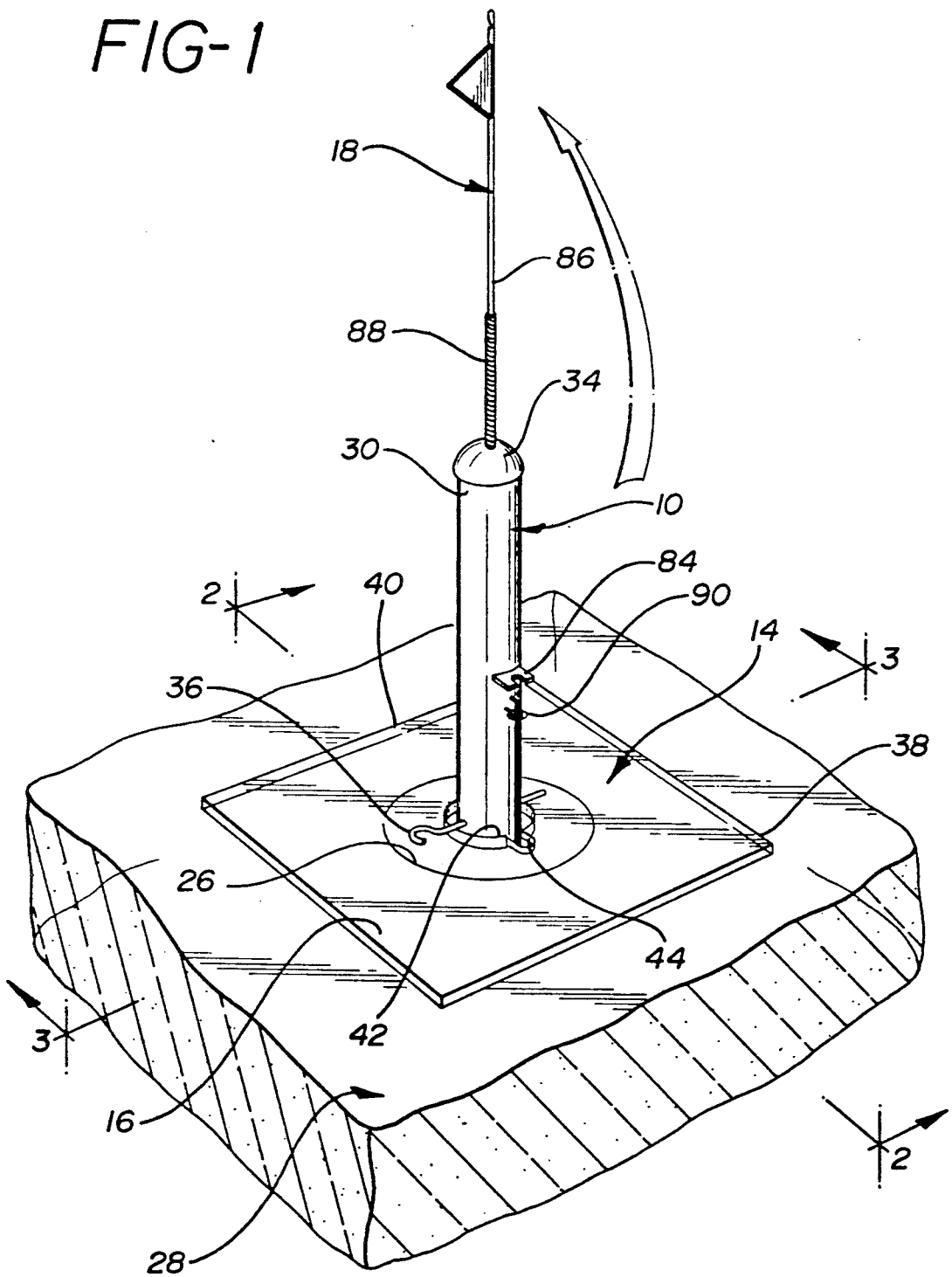
FIG. 1 is a view in perspective of a preferred embodiment of the apparatus of the present invention in place at a hole in the ice.
Figure 2:
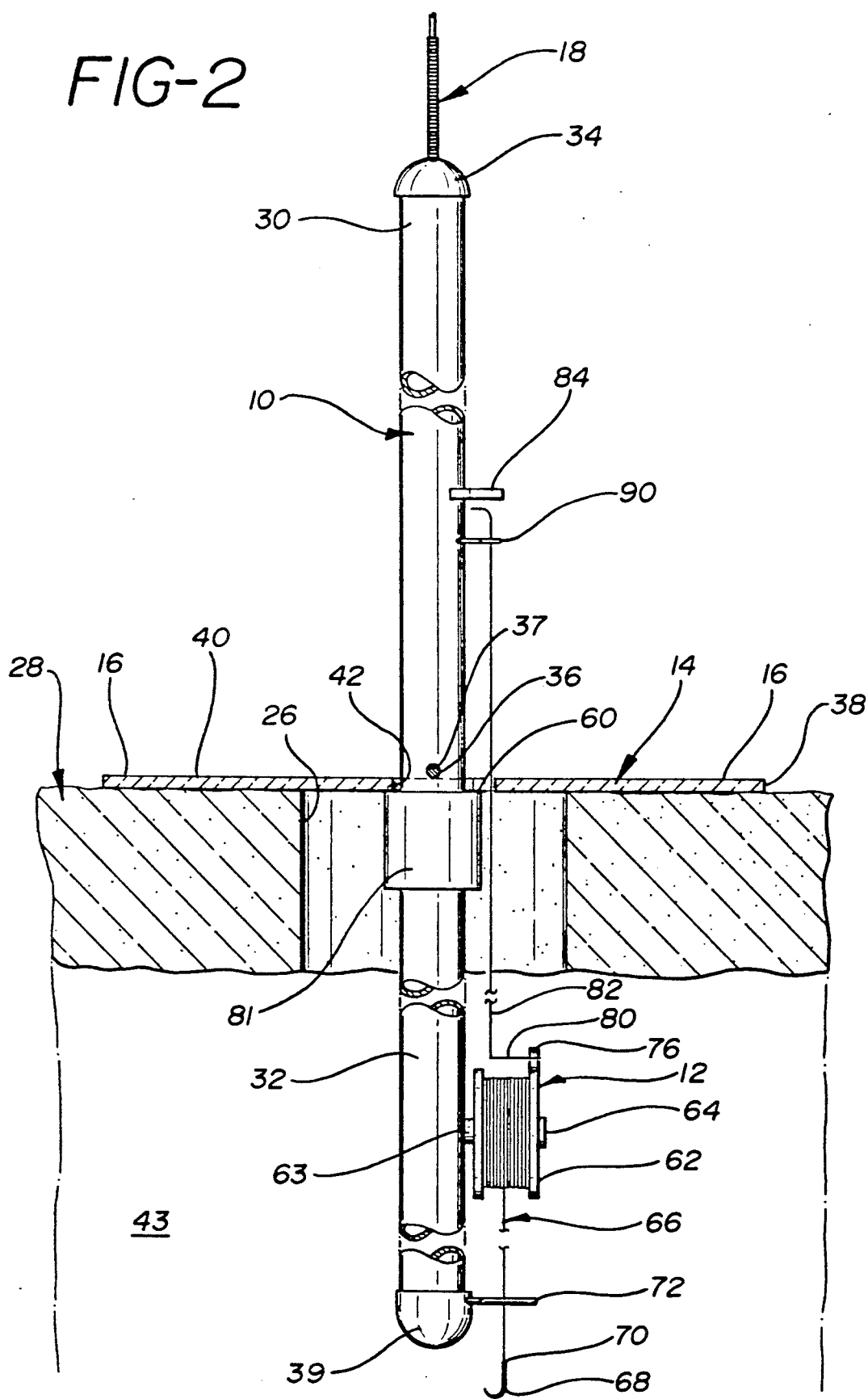
FIG. 2 is a sectional view of the invention along line 2—2 of FIG. 1.
Figure 3:
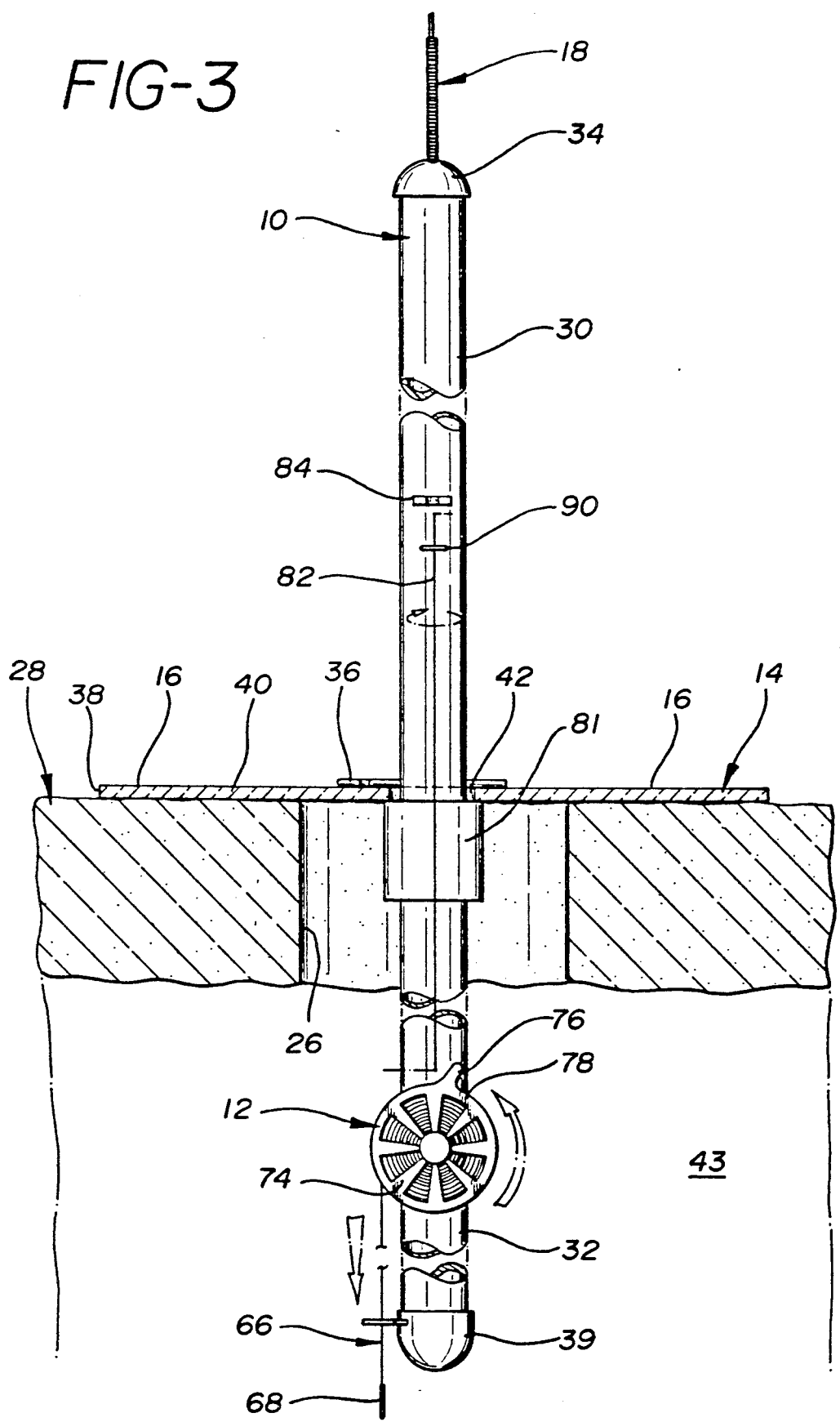
FIG. 3 is a sectional view of the invention along line 3—3 of FIG. 1.

FIGS. 1-3 illustrate a most preferred embodiment of the present invention. The apparatus, preferably a tipup, comprises body member 10, means to catch a fish 12, means to signal the catching of a fish 18, and light transmitting hole cover 14. The tipup is shown supported by the light transmitting hole cover 14 on the ice 28 at hole 26. The hole cover 12 is supported on the ice 28 at the edge 16 which extends beyond hole 26.

Radiant energy from the sun melts ice 28 and combines with the weight of the body member 10 to form a seal between the edge 16 of the cover 14 and the ice 28. A seal can also be formed merely by placed snow or ice along the boundary between edge 16 and the ice 28.

The body member of the tipup device can be any suitable shape and made of any suitable material. Its function is to provide support for elements of the present invention. As illustrated in the figures, the body member 10 provides support for the means to catch fish 12 and the means to signal catching of the fish 18. The body member itself can have a separate means to support the apparatus on the ice 28. In the embodiment shown in FIGS. 1-3, the body member is supported by hole cover 14 on the ice 28. The specific and preferred body member 10 is an elongated cylindrical, preferably tubular element or shaft 10 which can extend through the hole cover. The body member has an upper portion 30 which extends above cover 14 and a lower portion 32 which extends below the cover 14. The upper and lower portions can be part of one integral unit, i.e. tube. In a preferred embodiment illustrated in FIGS. 2 and 3, the upper portion 30 and the lower portion 32 are connected by a coupling 18. The upper portion and lower portion have suitable enclosing means such as upper cap 34 and lower cap 39. Preferably, the upper cap 34 is sealingly attached to the tube to prevent the tube from filling with snow and ice. The top cap 34 can be removably attached. The bottom cap 39 can be removably attached to the lower end of the tube. The bottom cap need not be sealingly attached so as to permit water to enter the lower portion 32 and prevent the tipup from having a tendency to float.

The body 10 as well as upper and lower caps 34 and 36 can be made of any suitable material. Preferred materials are materials which can withstand the rigors of the environment encountered during ice fishing. This includes maintaining its physical properties at water temperatures approaching 0° C. in fresh and salt water. Further, the body should be able to withstand wind and icy conditions and air temperatures up to −20° C. The material should also be light enough for easy transport. Useful materials include metal such as aluminum, wood and most preferably plastic. A particularly convenient, readily available and useful material for the body is polyvinylchloride (PVC) pipe. The most preferred dimension for the tube is the use of PVC pipe having an outer diameter of from $\frac{1}{4}$" to 2" and most preferably from $\frac{3}{8}$" to $1\frac{1}{2}$". The wall thickness can be from 1/16" to $\frac{1}{4}$" with the preferred wall thickness being approximately $\frac{1}{8}$". The upper portion 30 of the tube should extend from 3" to 24" and preferably from 9" to 18" with the most preferred upper portion being about 12" in length. The lower portion is from 3" to 24", preferably 9" to 18" and most preferably 9" to 15" in length. As indicated above, the upper and lower portions can be part of one integral tube. Where a coupling is used, the upper portion and lower portion are connected at coupling 18, preferably they are sealingly connected to the coupling by a suitable mechanical coupling or adhesive.

The light transmitting hole cover 14 can be any suitable shape. The hole cover preferably has an edge 16 surrounding hole 26. Preferably, edge 16 continuously surrounds the hole so that a seal can be provided between the surface of the ice 28 and edge 16. Alternatively, edge 16 can have contact points at sufficient locations merely to support cover 16. However, in the most preferred embodiment, edge 16 completely surrounds hole 26. In this way, a seal can be provided either by the contact of edge 16 on the ice as recited above or alternately or in combination by placing ice or snow around the circumference 38 of the hole cover to provide a seal between the ice and the hole cover.

The hole cover 14 permits light, preferably sunlight, to be transmitted through its light transmitting surface 40 above hole 26 to maintain the temperature in the hole above the freezing point of the water 42. It is therefore preferred that the hole cover 14 have minimum openings between the atmosphere and hole 26. There should be an appropriate opening in the hole cover at location 40 through which a portion of the apparatus passes to enable the means to catch fish to extend into the water. The opening can be at the edge 16 of the hole in the ice 26. Preferably, there is a hole 42 in cover 14 through which the body 10 passes.

The hole cover 14 is preferably made of a flat light transmitting material such as tempered glass and more preferably, plastic. Useful plastics include polyethylene, polycarbonate, and plexiglass type plastic which is preferred. The plastic cover should retain sufficient physical properties in environmental conditions commonly experienced during ice fishing. The cover should be sufficiently strong to support the apparatus over the hole 26 in the ice. Where body 10 is a tubular element, the hole 42 in the cover 14 is preferably from 1/16" to ¼" in diameter, greater than the outer diameter of the tube. In this way, a minimum amount of warm air will escape from hole 26 and a minimum amount of cool air and ice can enter the hole 26. There can be suitable cutouts such as cutout 44 for elements of the apparatus passing through hole 42 to pass through the cover 14 and at the same time minimize the opening through hole 42 to hole 26.

The cover is preferably from 1/16" to ½", more preferably ¼" to ⅜" thick. The cover can have any suitable circumferential shape. The outer configuration of the circumference 38 is not critical and can be any suitable shape. Preferred shapes are circular and square as shown in FIGS. 1-3. The outer shape of the circumference 38 is not critical and can conform to any suitable shape. Typically, ice fishing holes are from 3" in diameter up to 12" in diameter. The outer width of the cover 14 is preferably at least 1" and more preferably 2" wider than the hole with an approximate width being from 4" to 18" and most preferably about 12" in diameter.

Figure 4:
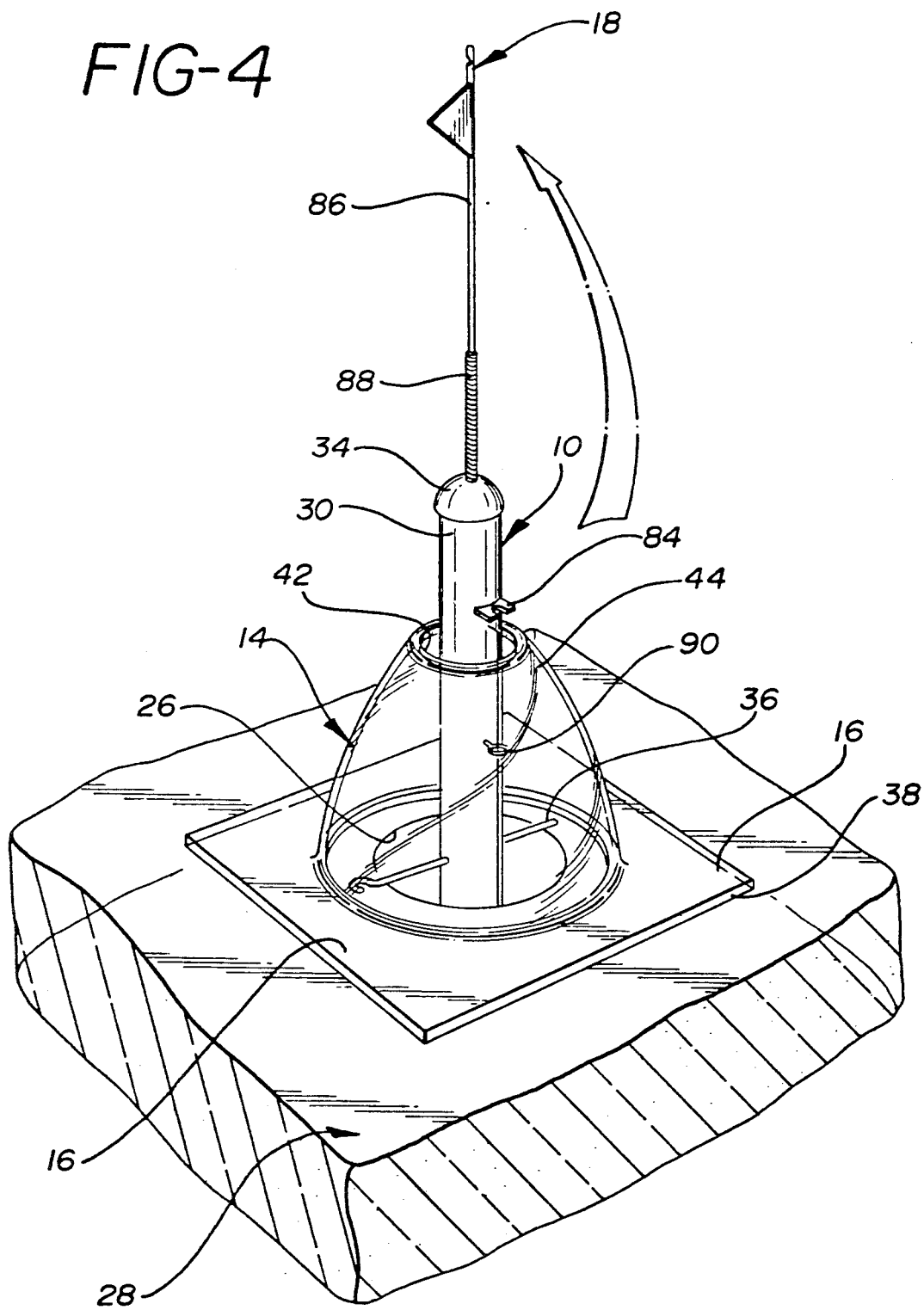
FIG. 4 is a view in perspective of an alternate embodiment of a hole cover.

The hole cover is preferably flat as this is the most convenient shape for manufacture, transportation and use. It is recognized that an important feature of the cover is to transmit light, while at the same time, isolating hole 26 from the environment. FIG. 4 shows a view in perspective of an alternate embodiment of the cover. The cover need not be flat or planer. As shown in FIG. 4, the cover can have a planer edge 16 and central dome shaped portion extending above the level of the ice 28. The curved surface extends from edge 16 to hole edge 42. In this way, the curved surface 44 of the dome can magnify the sun rays which actually heats the hole. Common elements in FIG. 4 have the same reference characters as shown in FIGS. 1-3. In FIG. 4, the portion above the hole is shown as reference character 44.

Figure 5:
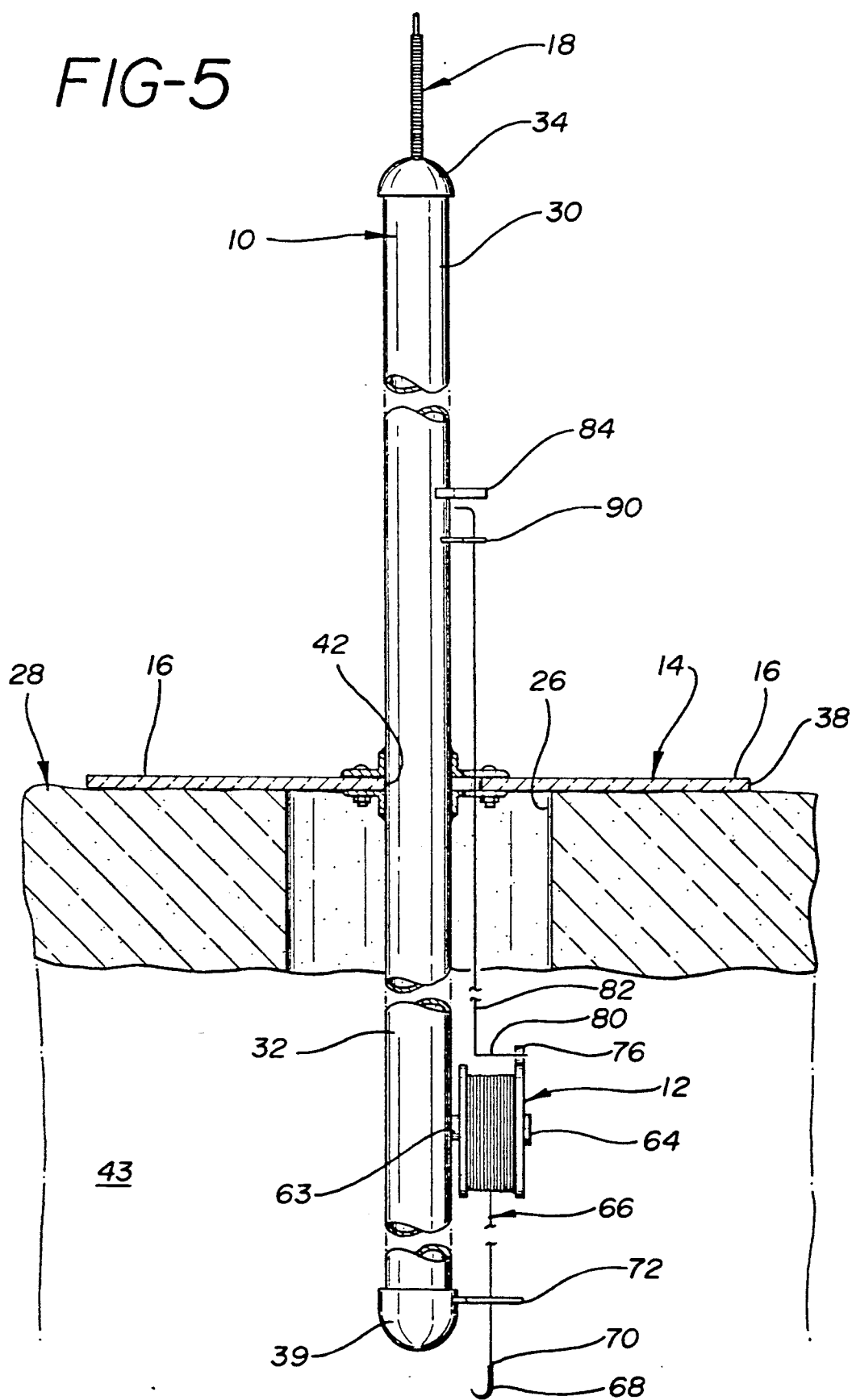
FIG. 5 is a sectional view of alternate embodiment of the apparatus of the present invention.

FIG. 5 illustrates another embodiment wherein the hole cover is integrally attached to the body tube. In this way, only small holes are necessary for appropriate elements which must pass through hole cover 14. While this provides more efficient sealing, the body element and hole cover are more difficult to transport.

In an embodiment shown in FIG. 6, a thin transparent film 52 can be used as cover 14 over the hole 26. In this embodiment, there can be means to support the apparatus separate from cover means 14. Such means are conventionally known and used with existing tipups. For example, the tipup shown in U.S. Pat. No. 2,651,875 shows the body member supported by transverse support members 50 and 50'. Accordingly, as shown in FIG. 6, transverse support members can be used to support the apparatus above hole 26 in the ice 28. The transverse support elements 50 and 50' rest on the surface of the ice 28. A film of light transmitting material 52 can be placed above or beneath the transversed elements and cover hole 26. The film can have a suitable hole 42 for the body and associated elements 10 to pass through into hole 26. Suitable materials for the film are polyethylene, fluoropolymer film, polyamide film and polyester film.

The apparatus comprises a suitable means to catch fish 12. A useful and preferred means to catch a fish, shown in FIGS. 2 and 3 as fishing reel 62, is rotably attached to axil 63 and extends traversely from the axis of lower portion 32 of body member 10. It can be locked in place by thumbscrew 64. Fishing line 66 is secured at one end to and wound around the inner diameter of fishing reel 18. The free end 70 of fishing line 66 is connected to hook 68 and passes through loop eyelet 72. Preferably there is a guide eyelet hook 73 extending perpendicularly from lower cap 39 to the axis of body member 10. Spokes 74 on reel 62 facilitate manual winding and rewinding of the reel 62. Protrusion 76 extends from edge 78 of reel 62. When a fish is caught on hook 68, reel 62 rotates and protrusion 76 engages trigger 80 which pushes wire 82 over to the side releasing catch 84 and signal flag 18 springs upward producing a signal. The signal flag 18 comprises a flexible flag shaft 86 attached to upper cap 34. Preferably a spring 88 is fixed at one end of upper cap 34. The means to signal is interconnected to the means to catch a fish 18 by trigger wire 82. Trigger wire 82 runs along body member 10 through the loops of eyelet guide hook 90 fixed to the surface of and extending traversely from body member 10. The lower end of trigger wire 82 is bent so as to make contact with protrusion 76 of reel 62 upon rotation of reel 62.

The apparatus of the present invention is supported by suitable supporting means above the hole 26 in the ice. In the preferred embodiments illustrated in FIGS. 1-3, the body member 10 is supported on the hole cover 14 the edge 16 of which is supported on the ice 28. It is preferred that the body member ice shaft or tube 10 which can be removably connected to the hole cover so that there is little axial movement along the axis of the shaft. One method to assure this connection is to lock the hole cover 14 between the upper portion 30 and lower portion of the shaft. In the preferred embodiment, there can be an extension from the shaft between the upper portion and lower portion. This is shown as part of coupling 81 between and connecting upper portion 30 and lower portion 32. The outer diameter of the coupling is greater than the outer diameter of the shaft. This forms a ridge 60 which preferably circumferentially extends from the outer surface of the shaft 10. Upon assembly, a suitable locking means locks the hole cover 16 against ridge 60. This is shown as pin 36 through a hole in shaft 10. Preferably, the ridge is in a plane perpendicular to the axis of the shaft 10 as is the pin hole 37 through which pin 36 passes. Upon removal of the pin, the cover can be lifted over the top upper portion of the shaft 30 and the apparatus disassembled for easy handling and transportation.

The preferred embodiment illustrated in FIGS. 1-3 can be easily disassembled. The apparatus is removed from the water and ice, and pin 36 is withdrawn from the pin hole in the upper portion 30 of shaft 10. The shaft is then slipped away from the hole cover 14 and the apparatus can be easily stored and carried. Preferably, the upper cap is removably connected to the upper portion 30 of shaft 10 for easy separation.

While exemplary embodiments of the invention have been described, the true scope of the invention is to be determined from the following claims.

What is claimed is:

1. An apparatus for fishing in water beneath a hole in the ice, the water having a water surface, comprising:
 a body member;
 a light transmitting hole cover to maintain at least a portion of the body member at the hole above the surface of the water; the hole cover being a flat, rigid sheet which is removable from the apparatus, wherein the flat hole cover is parallel to the ice;

a means to catch fish attached to the body member and capable of extending into the water; and a pin means to support the body on the hole cover.

2. The apparatus as recited in claim 1 wherein the light transmitting hole cover supports the body member on the ice surrounding the hole.

3. The apparatus as recited in claim 2 wherein the hole cover supports the apparatus on the ice surrounding the hole.

4. The apparatus as recited in claim 1 wherein the hole cover is transparent.

5. The apparatus as recited in claim 1 wherein the hole cover is connected to the body member.

6. The apparatus as recited in claim 3 further comprising a means to signal the catching of a fish attached to the body member and interconnected to the means to catch a fish.

7. The apparatus as recited in claim 6 wherein the means to signal the catching of a fish is attached to the body member.

8. The apparatus as recited in claim 1 further comprising:

a means to maintain at least a portion of the body member above the surface of the water.

9. The apparatus as recited in claim 8 wherein the means to maintain comprises the light transmitting hole cover connected to the body member.

10. The apparatus as recited in claim 1 wherein the light transmitting hole cover comprises a rigid sheet being flat at the edges, and the flat edges support the body member on the ice surrounding the hole.

11. The apparatus as recited in claim 8 wherein at least a portion of the body member passes through the light transmitting hole cover.

12. The apparatus as recited in claim 8 wherein the hole cover is transparent.

13. The apparatus as recited in claim 12 wherein the hole cover is a plastic sheet.

14. The apparatus as recited in claim 8 wherein the apparatus further comprises a means to signal the catching of a fish interconnected to the means to catch a fish.

15. The apparatus as recited in claim 14 wherein the means to signal the catching of a fish is attached to the body member.

16. The apparatus as recited in claim 1 wherein the hole cover is removable from the body member.

17. The apparatus as recited in claim 1 wherein the body member comprises a shaft having an upper portion and lower portion and an extension from the shaft between the upper portion and lower portion, and the apparatus further comprises a locking means to lock the hole cover against the extension.

18. The apparatus as recited in claim 17 wherein the hole cover has an opening through which the shaft passes clearance between the hole cover and elements of the apparatus passing through the hole cover is a minimum.

19. The apparatus as recited in claim 13 wherein the plastic is selected from the group consisting of polyethylene, polycarbonate and plexiglass.

20. The apparatus as recited in claim 8 wherein the means to maintain is a float connected to the body member.

21. An apparatus for fishing in water beneath a hole in the ice, the water having a water surface comprising:

a body member;

a light transmitting hole cover to maintain at least a portion of the body member at the hole above the surface of the water; the hole cover being a flat, rigid sheet which is removable from the apparatus, wherein the flat hole cover is parallel to the ice;

a means to catch fish attached to the body member and capable of extending into the water; and bracket means to fasten the body member to the hole cover.

* * * * *